United States Patent
Matsubara et al.

(10) Patent No.: US 6,334,079 B1
(45) Date of Patent: Dec. 25, 2001

(54) DETERMINATION METHOD AND APPARATUS FOR PERMITTING DECELERATION REGENERATION OR CHARGE OF HYBRID VEHICLE

(75) Inventors: Atsushi Matsubara; Shinichi Kitajima; Shigetaka Kuroda; Kan Nakaune; Takashi Iwamoto; Kazutomo Sawamura, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/631,681

(22) Filed: Aug. 2, 2000

(30) Foreign Application Priority Data

Aug. 4, 1999 (JP) .................................................. 11-221806

(51) Int. Cl.$^7$ ....................................................... G06F 7/00
(52) U.S. Cl. ............................. 701/22; 701/67; 180/65.1; 180/65.2
(58) Field of Search ........................ 701/22, 67; 180/165, 180/65.1, 65.2, 65.3, 65.7; 303/20; 318/139, 140

(56) References Cited

U.S. PATENT DOCUMENTS

| 5,635,805 | * | 6/1997 | Ibraki et al. | ........................ | 318/139 |
| 6,020,697 | * | 2/2000 | Shimasaki et al. | .................. | 318/140 |

FOREIGN PATENT DOCUMENTS

7-123509   5/1995 (JP) .

* cited by examiner

*Primary Examiner*—Yonel Beaulieu
(74) *Attorney, Agent, or Firm*—Armstrong, Westerman, Hattori, McLeland & Naughton, LLP (57) ABSTRACT

A determination method and apparatus for permitting deceleration regeneration or charge of a hybrid vehicle, by which erroneous determination relating to the clutch operation can be prevented. The method includes a first determination step of detecting clutch operation performed by a driver and determining a connection state of the clutch; a second determination step of determining a connection state of the clutch based on a correspondence relationship between vehicle speed and engine speed; and a permission determining step of permitting the deceleration regeneration or charge by the motor when it is determined that the clutch is connected both in the first and second determination steps.

2 Claims, 4 Drawing Sheets

DETERMINATION METHOD AND APPARATUS FOR PERMITTING DECELERATION REGENERATION OR CHARGE OF HYBRID VEHICLE

BACKGROUND OF THE INVENTION

1. Field of the Invention

The present invention relates to a determination method and apparatus for permitting deceleration regeneration or charge of a hybrid vehicle which has an electric motor as a power generating mechanism, in addition to the engine.

2. Description of the Related Art

From recent viewpoints relating to the protection of environment or the saving of energy, the so-called cylinder direct-injection engine for directly jetting fuel into the cylinder of the engine has been put to practical use as a power generator for vehicles such as cars. Currently, hybrid vehicles having a combined power system consisting of such an engine and an electric motor for driving are being developed.

As a hybrid vehicle, a parallel hybrid vehicle is known, which uses an electric motor as an auxiliary drive source for assisting the engine output. An example thereof is disclosed in Japanese Unexamined Patent Application, First Publication, No. Hei 7-123509. In the disclosed system, the engine output is assisted using the electric motor in the accelerating operation (i.e., acceleration mode), while in the decelerating operation (i.e., deceleration mode), the battery and the like are charged via a regenerating operation, that is, "deceleration regeneration" is performed. According to various control operations including the above, the remaining capacity of the battery is maintained while the driver's demands can also be satisfied.

In the deceleration regeneration, the electric motor is driven in reverse by the rotational force of the driving wheels so that the motor functions as a generator. In a parallel hybrid vehicle employing a manual transmission in which the output shaft of the engine and the output shaft of the electric motor are directly coupled, if the clutch is disconnected (or disengaged) during the deceleration-regenerating operation, the driving wheels do not drive the electric motor, so that all the torque generated by the electric motor functions as a load imposed on the engine. Generally, in the deceleration mode, the degree of opening of the throttle valve is small and the engine output is low. Therefore, if the deceleration regeneration is performed under such conditions, the torque generated by the electric motor is transmitted to the engine side as an excessive load. As a result, the engine (rotational) speed may decrease remarkably, or the engine may stall.

On the other hand, when the clutch is connected (or engaged) during the deceleration-regenerating operation, almost all of the torque generated by the electric motor is obtained by the rotational torque of the driving wheels; therefore, the torque generated by the electric motor is not applied to the engine side as a load in practice. Therefore, in the deceleration regeneration, the engine speed does not decrease remarkably and the engine does not stall.

Accordingly, when a conventional hybrid vehicle employing a manual transmission executes deceleration regeneration, the respective states of the gear and clutch are detected and it is determined whether the output shaft of the engine and the driving wheels are coupled with each other. When the clutch is connected and the vehicle is in gear, that is, when the electric motor is coupled with the driving wheel side, deceleration regeneration is permitted.

In such a hybrid vehicle employing a manual transmission, if the clutch is half connected (i.e., the clutch is halfway in) by the driver's operation in the deceleration mode, an erroneous determination that the clutch is connected may occur though the clutch is actually disconnected. As a result, deceleration regeneration is permitted and executed, so that the engine speed may decrease remarkably, or the engine may stall.

The relevant mechanism will be explained with reference to FIGS. 5 and 6.

Generally, in a vehicle employing a manual transmission, if the clutch is connected, for example, when the cranking of the engine is performed so as to start the engine, the vehicle may erroneously start due to the cranking. In order to prevent such an unexpected phenomenon, clutch switch $S_5$, set to on when clutch pedal 9 is depressed, is attached to a supporting member of the clutch pedal 9 (refer to FIG. 5), and cranking is permitted if the clutch switch $S_5$ is on.

Figure 5:
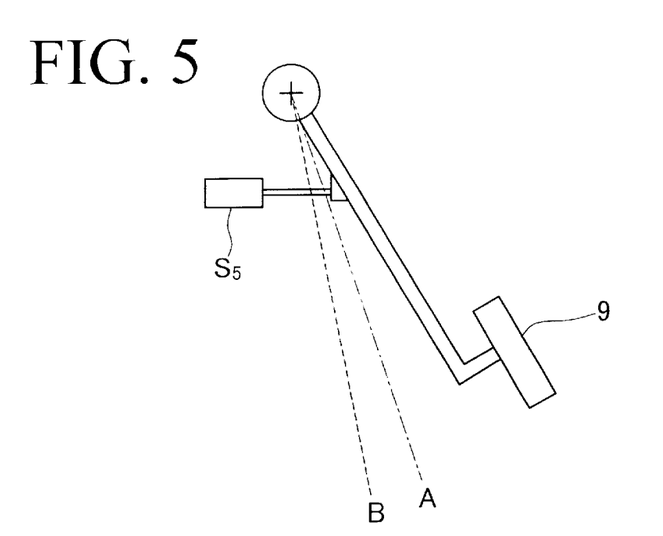
FIG. 5 is a diagram showing a relationship between the operation of the clutch switch and the clutch operation by the driver.
Figure 6:
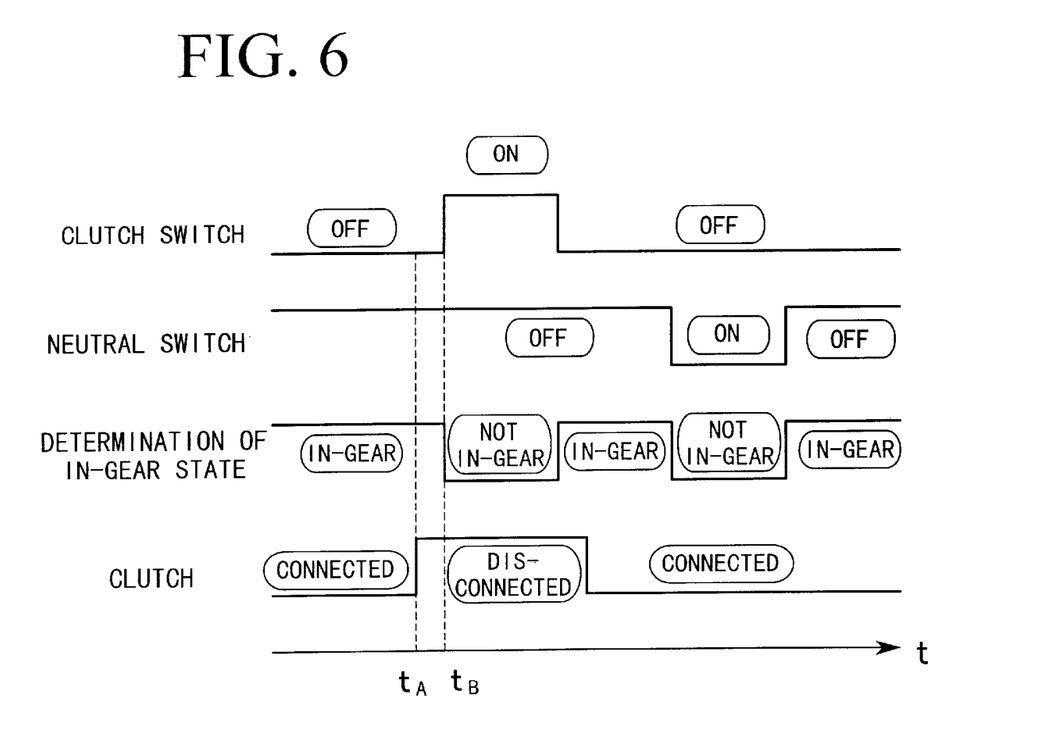
FIG. 6 is a waveform chart for explaining a relevant conventional technique.

In FIG. 5, line A indicates the depressed position (or degree) of clutch pedal 9 when the clutch is actually disconnected, while line B indicates the depressed position (or degree) of clutch pedal 9 when the clutch switch $S_5$ is set to on. As shown in the figure, the degree of depression of line B is larger than the degree of depression of line A. Therefore, even if the clutch becomes worn down and the clutch contact is shifted, it is possible to reliably detect the state that the clutch is completely disconnected, and to reliably prevent an unexpected phenomenon such as the erroneous start caused by the cranking.

On the other hand, in order to execute the above-explained deceleration regeneration, the clutch must be connected so as to transmit the rotational torque of the driving wheel side to the output shaft of the electric motor (used for driving). Therefore, the connection state of the clutch must be detected. Accordingly, when determining whether the deceleration regeneration should be permitted in a hybrid vehicle, the connection state of the clutch is detected using the above-described clutch switch $S_5$. In the determination, deceleration regeneration is permitted when the clutch switch $S_5$ is off.

However, in the deceleration mode, if the depressed clutch pedal 9 is positioned between line A and line B of FIG. 5 (for example, when the clutch is half connected), it is determined that the clutch is connected though the clutch is actually disconnected, as described above. Therefore, a result of an erroneous determination to permit the deceleration regeneration is output. Accordingly, an excessive regeneration load is applied to the engine in the deceleration driving state (or the idling state), which may cause a remarkable decrease in the engine speed, engine stall, or the like.

Similar problems may occur in the cruising operation.

That is, if the clutch pedal 9 is depressed and is positioned between the above lines A and B while the engine is driven at low engine speed, it is determined that the clutch is connected though the clutch is actually disconnected, so that an erroneous determination to permit the charging operation is made. As a result, an excessive charge load is applied to the engine in the cruise driving state (i.e., low output state), which may also cause a remarkable decrease in the engine speed, engine stall, or the like.

SUMMARY OF THE INVENTION

In consideration of the above circumstances, an objective of the present invention is to provide a determination method and apparatus for permitting deceleration regeneration or charge of a hybrid vehicle, with which erroneous determinations relating to the clutch operation can be prevented.

Therefore, the present invention provides a determination method for permitting deceleration regeneration or charge of a hybrid vehicle, wherein:

the hybrid vehicle comprises:
an engine for outputting force for driving the vehicle;
an electric motor for assisting the output from the engine; and
a battery device for storing charged energy generated by the electric motor which functions as a generator for deceleration regeneration or charge, and
the determination method comprising:
a first determination step of detecting a clutch operation performed by a driver and determining a connection state of the clutch;
a second determination step of determining a connection state of the clutch based on a correspondence relationship between vehicle speed and engine speed; and
a permission determining step of permitting the deceleration regeneration or charge by the motor when it is determined that the clutch is connected both in the first and second determination steps.

According to the method, in the first determination method, the driver's clutch operation, for example, in the decelerating or cruising operation, is detected by using, for example, a switch or sensor, and the connection state of the clutch is determined based on the detected state. If the clutch is not depressed by the driver and thus no clutch operation is detected, it is determined that the clutch is connected. While if the clutch is depressed by the driver and thus clutch operation is detected, it is determined that the clutch is not connected, that is, the clutch is disconnected. If it is determined that the clutch is connected in the first determination step, then the correspondence relationship between vehicle speed and engine speed is analyzed, so as to further determine the connection state of the clutch.

Here, if the clutch is completely connected, and thus if the output shaft of the engine is coupled with the driving wheels, then the vehicle speed (proportionally) corresponds to the engine speed according to each gear ratio. In contrast, if the clutch is not connected and the output shaft of the engine is not coupled with driving wheels, then there is no correspondence relationship between the vehicle speed and the engine speed. That is, by analyzing and determining whether the vehicle speed and the engine speed has such a correspondence relationship, it is possible to determine whether the clutch is completely connected, and thus to detect the state in which the output shaft of the engine is reliably coupled with the driving wheels. In other words, by analyzing and determining whether the vehicle speed and the engine speed have such a correspondence relationship, it is possible to determine whether the clutch is not completely connected, and thus to detect the state in which the output shaft of the engine is not reliably coupled with the driving wheels.

Accordingly, deceleration regeneration or charge by the motor is permitted when it is determined that the clutch is connected both in the first and second determination steps, while if it is determined that the clutch is not connected in the first or second determination step, the deceleration regeneration or charge is not permitted or forcibly prohibited. Therefore, while the clutch is not in the completely-connected state, for example, is half connected (i.e., the clutch is halfway in), the deceleration regeneration/charge is not permitted, and thus the deceleration regeneration/charge is permitted only when the clutch is completely connected. Therefore, no erroneous determinations relating to the deceleration regeneration/charge caused by the driver's clutch operation are made.

In addition, no load generated by the deceleration regeneration/charge is applied to the engine while the engine output is low in the operation mode such as deceleration, cruising, or the like. Therefore, it is possible to prevent an undesirable remarkable decrease in engine speed, or engine stall caused by the deceleration regeneration or charge.

According to the present invention, a determination operation based on checking whether the clutch is not completely connected is also possible. In this case, the clutch operation is detected, and if it is determined that the clutch is connected, then it is further determined whether the clutch is "not" connected based on a correspondence relationship between the vehicle speed and engine speed. If it is determined that the clutch is "not" connected, then the deceleration regeneration/charge is prohibited. That is, the present invention can be used as a method for prohibiting the deceleration regeneration/charge while the clutch is not connected, for example, when the clutch is completely disconnected or half connected.

As a typical example, a series of said steps is repeatedly executed, and the second determination step includes:
calculating a gear position based on actually-detected vehicle speed and engine speed by referring to a correspondence relationship between the vehicle speed and engine speed, which is predetermined for each gear position; and
determining that the clutch is connected when there is no temporal change with respect to the calculated gear position.

When the clutch is actually connected, the vehicle speed changes according to the engine speed; thus, the continuously-calculated gear position does not change. In contrast, when the clutch is not connected, the vehicle speed and the engine speed do not have a correspondence relationship; thus, the continuously-calculated gear position gradually changes. Therefore, according to changes in the continuously-calculated gear position, it is possible to determine the connection state of the clutch. Based on the determined result, permission for the deceleration regeneration/charge is determined.

The present invention also provides a determination apparatus for permitting deceleration regeneration or charge of a hybrid vehicle, wherein:

the hybrid vehicle comprises:
an engine for outputting force for driving the vehicle;
an electric motor for assisting the output from the engine; and
a battery device for storing charged energy generated by the electric motor which functions as a generator for deceleration regeneration or charge, and
the determination apparatus comprising:
a first determination section for detecting a clutch operation performed by a driver and determining a connection state of the clutch;
a second determination section for determining a connection state of the clutch based on a correspondence relationship between vehicle speed and engine speed; and
a permission determining section for permitting the deceleration regeneration or charge by the motor when it is determined that the clutch is connected both in the first and second determination sections.

Typically, a series of processes performed by said sections is repeatedly executed, and the second determination section:

calculates a gear position based on actually-detected vehicle speed and engine speed by referring to a correspondence relationship between the vehicle speed and engine speed, which is predetermined for each gear position; and determines that the clutch is connected when there is no temporal change with respect to the calculated gear position.

DESCRIPTION OF THE PREFERRED EMBODIMENTS

Hereinafter, an embodiment according to the present invention will be explained with reference to the drawings, where the case of determining whether deceleration regeneration should be permitted is explained.

Figure 1:
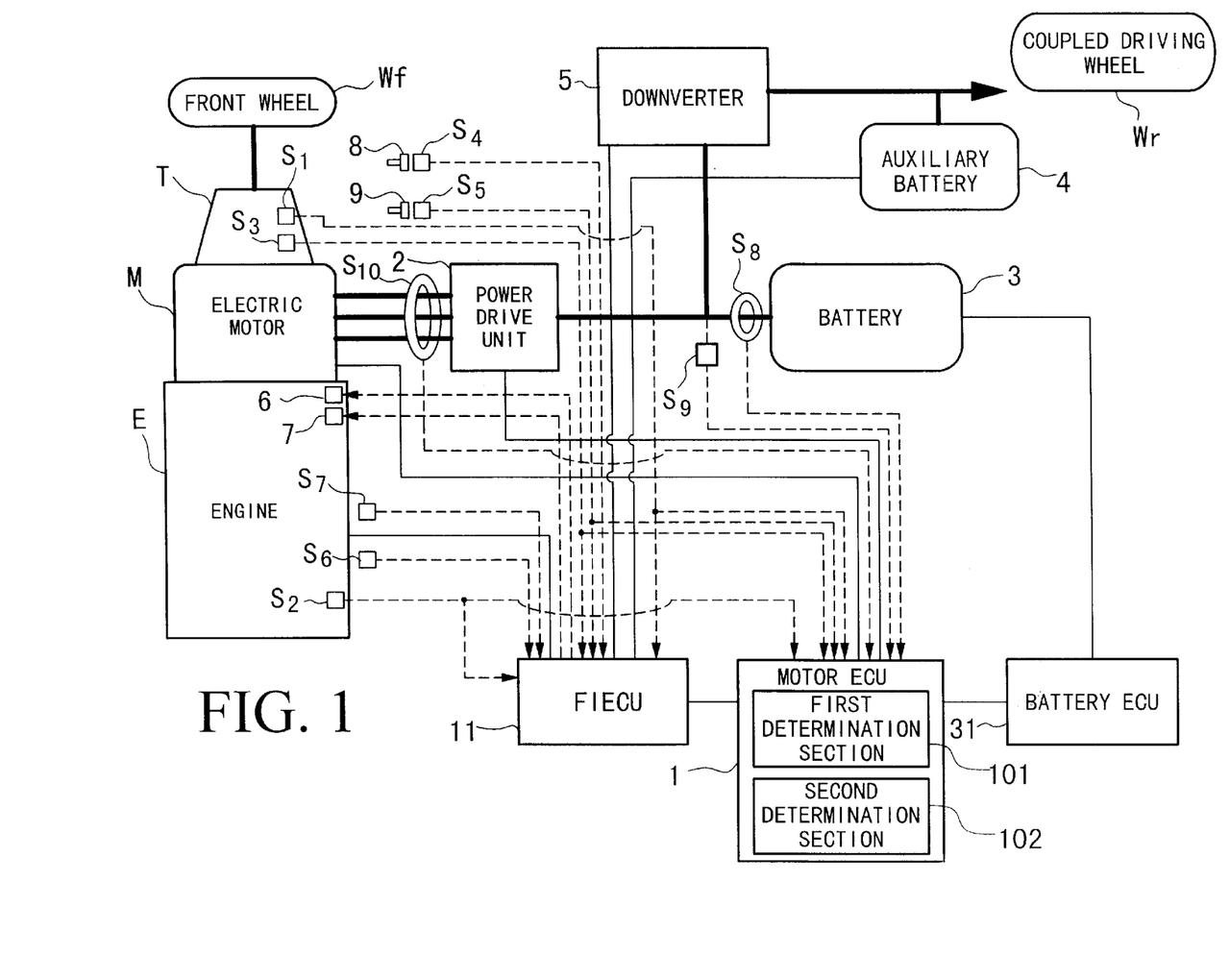
FIG. 1 is a block diagram showing the general structure of the power system to which an embodiment of the determination method/apparatus for permitting the deceleration regeneration according to the present invention is applied.

FIG. 1 shows the general structure of the power (generating) system to which the determination method for permitting deceleration regeneration of the embodiment is applied. The power mechanism (for driving the vehicle) of this power system includes engine E for outputting the driving force for the vehicle and electric motor M for assisting the output of engine E. The driving force generated by both the engine E and motor M is transmitted via manual transmission T to the front wheels (functioning as driving wheels) Wf, Wf. In the deceleration of the hybrid vehicle, when the driving force is transmitted from the front wheels Wf, Wf to the electric motor M, the electric motor M functions as a generator for generating, so-called, regenerative braking force, that is, the kinetic energy of the vehicle body is stored as electric energy.

The driving of motor M and the regenerating operation of motor M are performed by a power drive unit 2 according to control commands from a motor ECU 1. A high voltage battery 3 for sending and receiving electric energy to and from the motor M is connected to the power drive unit 2. The battery 3 includes a plurality of modules connected in series, and in each module, a plurality of cells are connected in series. The hybrid vehicle includes a 12 volt auxiliary battery 4 for driving various accessories. The auxiliary battery 4 is connected to the battery 3 via a downverter 5. The downverter 5, controlled by an FIECU 11, reduces the voltage from the battery 3 so as to charge the auxiliary battery 4.

The motor ECU 1, managed by FIECU 11 (explained later), controls the driven state of electric motor M. According to input signals from current sensor $S_8$ and voltage sensor $S_9$ which respectively detect the current and voltage supplied from battery 3, and to an input signal from current sensor $S_{10}$ for detecting three-phase current supplied from the power drive unit 2 to electric motor M, the motor ECU 1 drives and controls the power drive unit 2.

The FIECU 11 controls, in addition to the motor ECU 1 and the downverter 5, a fuel supply amount controller 6 for controlling the amount of fuel supplied to the engine E, a starter motor 7, an ignition timing, etc. Therefore, the FIECU 11 receives (i) a signal from a speed sensor $S_1$ for detecting the vehicle speed based on the rotation of the drive shaft of transmission T, (ii) a signal from an engine (rotational) speed sensor $S_2$ for detecting the engine (rotational) speed, (iii) a signal from a neutral switch $S_3$ for detecting the neutral position of the transmission T, (iv) a signal from a brake switch $S_4$ for detecting operation of a brake pedal 8, (v) a signal from a clutch switch $S_5$ for detecting the operation of a clutch pedal 9, (vi) a signal from a throttle opening-degree sensor $S_6$ for detecting the degree of opening of the throttle valve, and (vii) a signal from an air-intake passage negative-pressure sensor $S_7$ for detecting the air-intake passage negative pressure.

The determination apparatus for permitting deceleration regeneration in the present embodiment is realized as one of the functions of motor ECU 1. That is, in addition to the above-explained function of controlling and driving motor M, the motor ECU 1 functions as (i) first determination section 101 for detecting the clutch operation based on a signal from the clutch switch $S_5$ which operates according to the clutch operation, and determining whether the clutch is connected (or engaged) in the deceleration mode, and (ii) second determination section 102 for determining the connection state of the clutch based on a correspondence relationship between the vehicle speed and the engine speed, and determining whether deceleration regeneration should be permitted. Here, the above determining operation may be performed in an engine ECU (i.e., engine electrical control unit). In this case, the engine ECU outputs a permission signal to the motor ECU.

Below, the operation of determining whether to permit deceleration regeneration, performed by the motor ECU 1 according to the present embodiment, will be explained with reference to the flowchart shown in FIG. 2.

Figure 2:
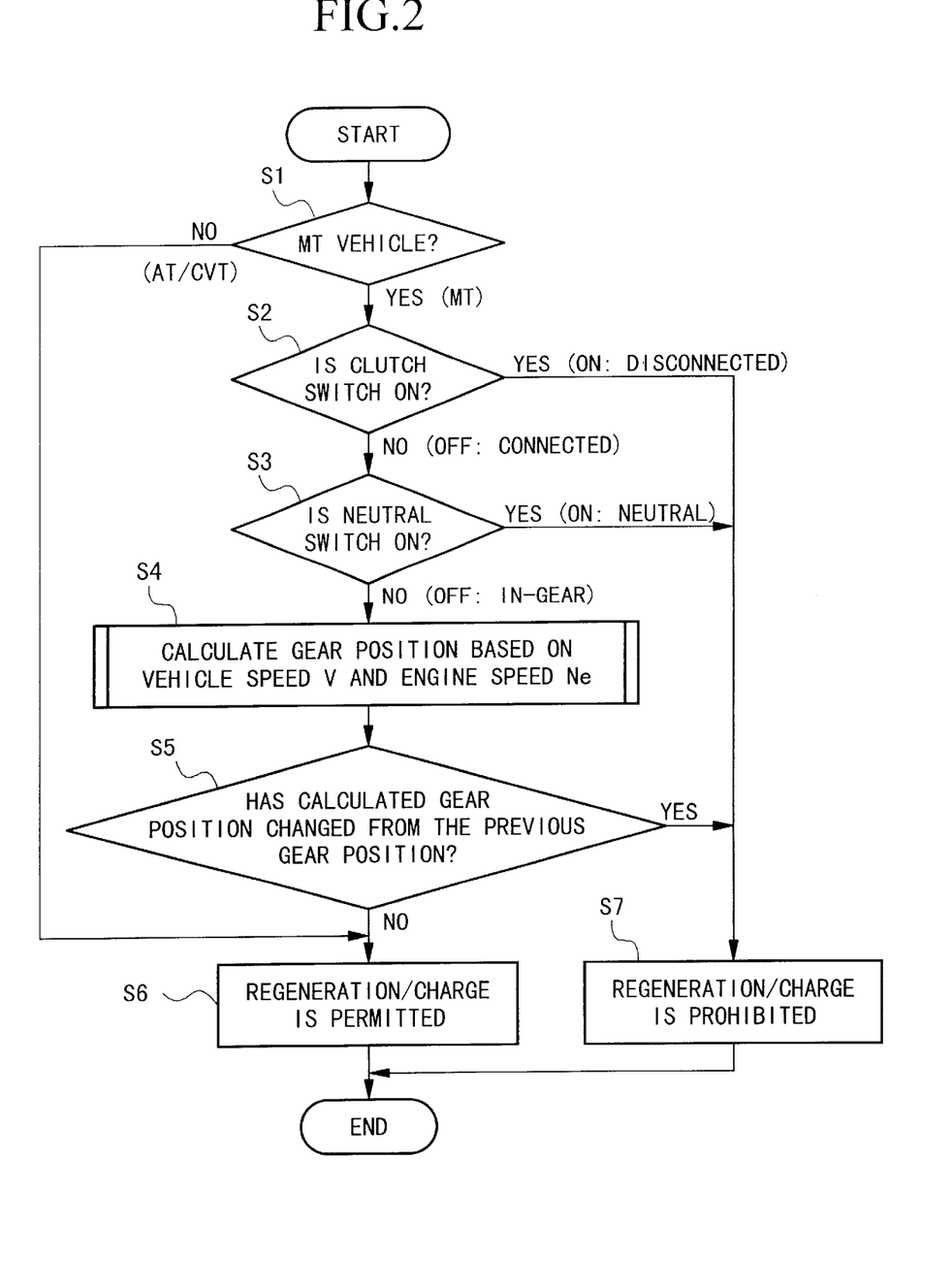
FIG. 2 is a flowchart showing the operation of the determination apparatus for permitting the deceleration regeneration of the embodiment.

As a premise for executing the operation shown by the flowchart of FIG. 2, it is necessary that the driving mode of the vehicle be in deceleration mode. Therefore, the driving mode is determined in advance. Generally, there are also an acceleration mode, a cruise mode, and an idle mode. In the acceleration mode, the output of engine is assisted using the electric motor, while in the deceleration mode, the regeneration operation is performed. In the cruise and idle modes, power generation using the motor is performed. When the driving mode is the deceleration mode, a series of steps (S1 to S7 shown in FIG. 2) is repeatedly performed at predetermined intervals (for example, of a millisecond order), so that the operation for determining whether to permit deceleration regeneration is performed according to the driving state which changes from moment to moment.

Below, the operation performed in each period will be explained.

Step S1: When the driving mode is in the deceleration mode, motor ECU 1 determines whether the vehicle to which the present permission determining apparatus is mounted employs a manual transmission (MT), that is, whether the vehicle is an MT vehicle. That is, the determination apparatus for permitting deceleration regeneration according to the present embodiment is applied to such an MT vehicle which requires a clutch operation performed by the driver, and the operation of vehicles employing an automatic transmission (i.e., an AT vehicle) or vehicles employing a continuously variable transmission (CVT) is not considered here.

Step S2: If it is determined, in step 1, that the current vehicle is an MT vehicle (i.e., "YES"), the motor ECU 1 determines the operational state of clutch switch $S_5$ (i.e., on or off) which is switched according to the clutch operation by the driver. As shown in FIG. 5 (explained above), this clutch switch $S_5$ is set to "on" at line B which is a more depressed position for clutch pedal 9 in comparison with line A where the clutch is actually disconnected. That is, two different depressed positions are defined, so that the clutch switch $S_5$ is set to on after the clutch is completely disconnected. Therefore, it is possible to detect the state in which the clutch is completely disconnected or disengaged.

Step S3: If it is determined, in step 2, that the clutch switch $S_5$ is off (i.e., "NO"), the motor ECU 1 further determines the operational state of neutral switch $S_3$ (i.e., on or off). In the present embodiment, the neutral switch $S_3$ is set to on when the gear position is the neutral one, or is set to off when the gear position is other than a neutral one (i.e., in gear).

In the present embodiment, if it is determined that (i) the clutch switch $S_5$ is off (that is, connected in step S2) and (ii) the neutral switch $S_3$ is off (that is, in gear in step S3), then based on the logic determined by these switches, it is determined that the output shaft of the engine is coupled with the driving wheel, and this state is called the "in-gear" state.

Step 4: If it is determined, in step S3, that the neutral switch $S_3$ is off, that is, in the in-gear state, then the motor ECU 1 performs a calculation for determining the gear position, based on vehicle speed V detected by (vehicle) speed sensor $S_1$ and on engine speed Ne detected by the engine speed sensor $S_2$, thereby calculating (or evaluating) the gear position based on the above vehicle speed V and engine speed Ne. The calculated value indicating the gear position is retained until the operation in the next turn is performed.

Below, the operation of calculating the gear position will be explained.

Figure 3:
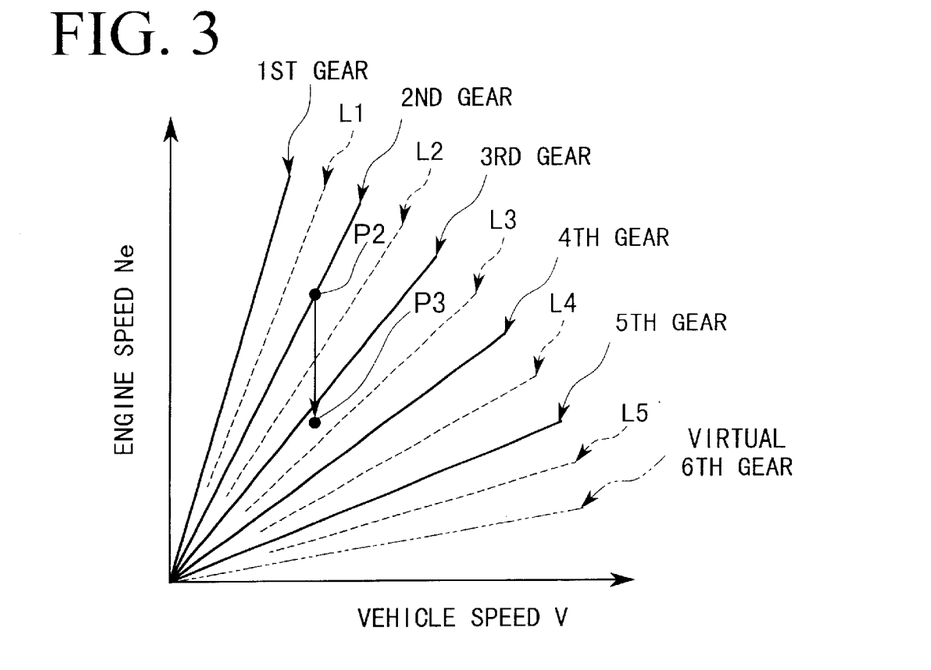
FIG. 3 is a diagram for explaining the principle of calculating the gear position of the embodiment.

First, the principle of calculating the gear position will be explained with reference to FIG. 3. FIG. 3 shows the correspondence relationship between the vehicle speed V and engine speed Ne. In an MT vehicle, when the vehicle is in gear (i.e., the gear position is other than a neutral one) and the clutch is completely connected, the output shaft of the engine and the driving wheels are coupled with each other. In this state, the correspondence relationship between the vehicle speed V and engine speed Ne is a proportional relationship determined according to each gear ratio (see characteristic lines indicated by solid lines in FIG. 3).

Therefore, when the output shaft of the engine is coupled with the driving wheels, the engine speed Ne and vehicle speed V are represented by any point on one of the characteristic lines (i.e., the above-mentioned solid lines) which corresponds to the current gear. Therefore, by predetermining such a relationship, it is possible to determine to which characteristic line (as shown in FIG. 3) the calculated coordinate point determined by the actual engine speed and the vehicle speed belongs, so that the current gear position can be calculated (or evaluated) according to the determination.

As shown in FIG. 3, in the present embodiment, between the characteristic lines of the 1st (or low) gear and the 2nd gear, boundary line L1 indicating a boundary between these characteristic lines is defined. Similarly, boundary lines L2 to L4 are defined at each boundary between the gear positions of the 2nd to 5th (or top) gears. Additionally, as explained later, in order to determine a change from the 5th gear, a virtual 6th gear, which is not provided as an actual and effective gear position, is defined, and a boundary line L5 is defined between the characteristic lines of the 5th gear and the virtual 6th gear. Therefore, the graph area is divided into six areas by five boundary lines L1 to L5 indicating each boundary of the gear positions, and an area to which the target coordinate point, determined by the actually detected vehicle speed and engine speed, belongs is determined, thereby calculating and determining the relevant gear position.

Step S5: Next, it is determined whether the gear position, calculated in step S4, has changed in a predetermined period. More specifically, it is determined whether the gear position currently detected is different from the gear position which was calculated in the previous cycle of the determination operation.

In the present invention, a change of the gear position is detected using a phenomenon that the engine speed much remarkably decreases in comparison with the vehicle speed when the clutch becomes disconnected (from the connected state) in the deceleration mode. That is, in the deceleration, the degree of opening of the throttle valve is small; therefore, when the clutch becomes disconnected, the rotational torque at the driving wheel side is not transmitted to the engine side, so that the engine goes into an idling state. Accordingly, the engine speed Ne noticeably decreases in comparison with the vehicle speed V.

As explained above, in the example shown in FIG. 3, each coordinate point is specified by the vehicle speed V and the engine speed Ne. For example, point P2 belonging to the area assigned to the 2nd gear is shifted to point P3 belonging to the area assigned to the 3rd gear. In this case, the calculated (or evaluated) gear position is changed from the 2nd gear to the 3rd gear though the gear shifting operation has not actually been performed. As explained above, according to a temporal change of the calculated gear position, it is possible to detect the state that the clutch is not completely connected (e.g., halfway in the clutch).

When the clutch changes from the connected state to the disconnected state in the deceleration mode of the vehicle, the engine speed changes towards the lower side, and the calculated gear position in such a state changes towards the up-shift side. Therefore, in order to indicate a change of the gear position from the 5th gear, the above-explained virtual 6th gear, which is not actually provided in the vehicle, is defined. Accordingly, if the previously-calculated gear position is the 5th gear and the currently-calculated gear position is the virtual 6th gear, then it is determined that the gear position has been shifted.

Step S6: If it is determined, in step S5, that there is no temporal change in the gear position calculated in step S4 (i.e., "NO" in step S5), then it is determined that the vehicle speed V and the engine speed Ne satisfy the correspondence relationship indicated by the characteristic lines shown in FIG. 3, and that the clutch is currently connected (that is, the output shaft of engine E and the driving wheels are coupled). Therefore, if it is determined that the clutch is connected in the above step S2 and it is also determined that the clutch is connected in the above step S5, then it is determined that the electric motor M can be driven by the rotational torque of the driving wheel, so that deceleration regeneration is permitted. Accordingly, the kinetic energy is regenerated as electric power via the electric motor M, thereby charging the high voltage battery 3.

Step S7: In contrast, if it is determined, in step S5, that there is a temporal change in the gear position calculated in step S4 (i.e., "YES" in step S5), then it is determined that the vehicle speed V and the engine speed Ne do not satisfy the correspondence relationship indicated by the characteristic lines shown in FIG. 3, and that the clutch is currently disconnected (that is, the output shaft of engine E and the driving wheels are not coupled). Therefore, in this case, it is determined that the electric motor M cannot be driven by the rotational torque of the driving wheel, so that deceleration regeneration is prohibited.

If it is determined, in the above step S1, that the vehicle is not an MT vehicle (i.e., "NO" in step S1), then step S6 is executed and the deceleration regeneration is permitted, and the above steps S2 to S5 are not executed. In addition, if it is determined, in the above step S2, that the clutch switch 9 is on (i.e., "YES (i.e., ON)" in step S2), then step S7 is executed and the deceleration regeneration is prohibited, so that the above steps S3 to S6 are not executed. In addition, if it is determined, in the above step S3, that the neutral switch $S_3$ is on (i.e., "YES (i.e., ON)" in step S3), then step S7 is executed also in this case and deceleration regeneration is prohibited, so that the above steps S4 to S6 are not executed.

Figure 4:
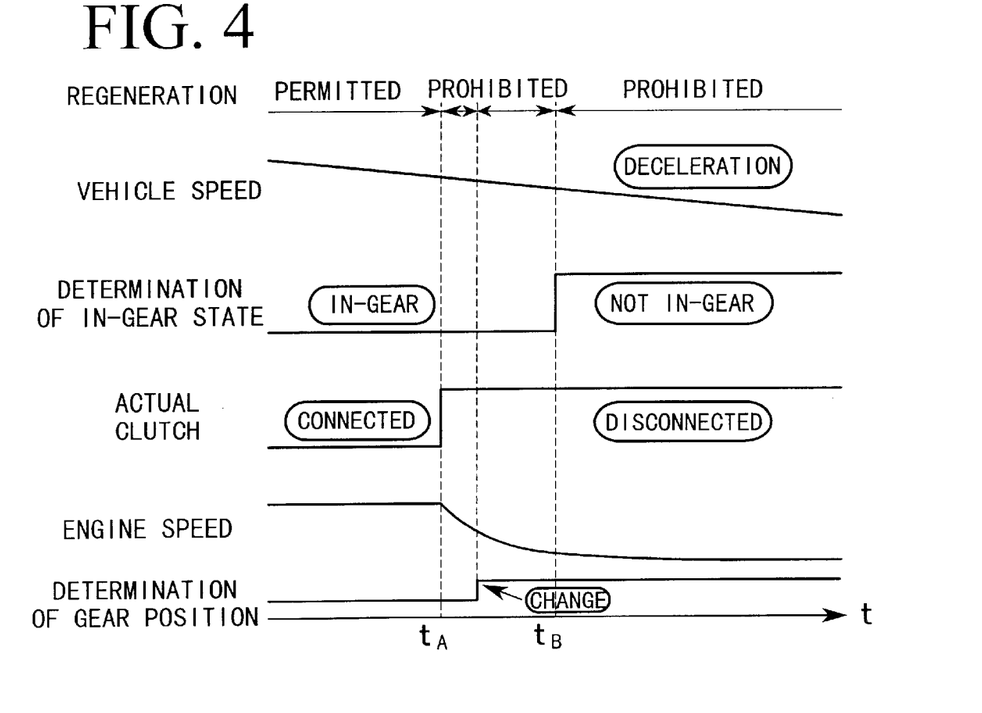
FIG. 4 is a waveform chart explaining the operation of the determination apparatus for permitting the deceleration regeneration of the embodiment.

Below, a specific example according to the operational flow from step S1 to step S7 will be explained with reference to FIG. 4, where the operational flow is repeated at predetermined intervals so as to determine whether deceleration regeneration should be permitted, according to the driving state which changes from moment to moment.

Here, it is assumed that the gear position is set in the 3rd gear by the driver's operation and that vehicle speed V is gradually decreased while both the clutch pedal and accelerator pedal are not depressed. In the above state, the clutch switch $S_5$ is off and the neutral switch $S_3$ is off, then it is determined, in the above steps S2 and S3, that the vehicle is in the in-gear state. Accordingly, the gear position is calculated in the above step S4, and it is determined, in the above step S5, whether the gear position has been changed.

In the current state, the gear position is set in the 3rd gear, and the clutch is completely connected; thus, the vehicle speed and the engine speed satisfy the correspondence relationship as shown in FIG. 3. Therefore, it is determined that there is no change in the gear position, so that deceleration regeneration is permitted in step S6. Such a determining operation for permitting deceleration regeneration is repeated until time $t_A$ when the clutch is disconnected.

Next, when the driver depresses the clutch pedal and the depressed position of the clutch pedal reaches line A (see FIG. 5), the clutch then actually begins to be disconnected and is gradually disconnected, so that the rotational torque from the driving wheels is not transmitted to the engine side. As a result, the engine speed starts decreasing towards the idling speed. In the repeated operation of the above operational flow under such conditions, it is determined, in step S5, that the gear position (calculated in step S4) has been changed, and the deceleration regeneration is prohibited in step S7. As explained above, in a period from time $t_A$ to time $t_B$ when the clutch switch turns on, prohibition of deceleration regeneration is repeatedly determined based on the correspondence relationship between the vehicle speed and the engine speed.

When the driver further depresses the clutch pedal to line B (see FIG. 5) at time $t_B$, the clutch switch $S_5$ is turned on. As a result, it is determined, in steps S2 to S3, that the vehicle is not in the in-gear state and deceleration regeneration is prohibited in step S7. Accordingly, after time $t_B$ (when the clutch switch is turned on), prohibition of deceleration regeneration is repeatedly determined based on the logic of the clutch switch $S_5$.

That is, deceleration regeneration is permitted while the clutch is actually connected, and deceleration regeneration is forcibly prohibited while the clutch is disconnected or the clutch is halfway in.

According to the present embodiment explained above, deceleration regeneration is permitted when the rotational torque of the driving wheel is sufficiently transmitted to the electric motor. Therefore, the determination for permitting deceleration regeneration is reliably performed, so that the load generated by the regeneration is not directly transmitted to the engine in the deceleration mode, and an undesired remarkable decrease in the engine speed, and engine stall caused by the deceleration regeneration do not occur.

Additionally, based on the relationship between the vehicle speed and the engine speed, deceleration regeneration is prohibited while the clutch is not in the completely connected or engaged state; thus, no load caused by the regeneration is generated and it is possible to reliably prevent an undesired remarkable decrease in the engine speed, and engine stall caused by such a load.

In the above embodiment, the determination for permitting deceleration regeneration has been explained. However, the present invention can also be applied, for example, to determination for permitting charging while in the cruise mode. More specifically, in the cruise mode, the operational flow as shown in FIG. 2 may be repeatedly performed, and in step S6, permissibility for charging is determined, while in step S7, prohibition of the charge is determined. Accordingly, it is possible to prevent a situation in which charging is permitted while the clutch is disconnected in the cruise mode, and to prevent a decrease in the engine speed caused by the charging.

The present invention is not limited to the above explained embodiment, but any design modification within the scope and spirit of the present invention is possible. For example, in the above embodiment, in addition to determination of the state of clutch switch S6 in step S2 (refer to FIG. 2), the state of neutral switch $S_3$ is determined in step $S_3$ and then the gear position is calculated in step S4. However, step S3 may be omitted according to need. In this case, another step corresponding to step S3 may be performed as a premise for performing the series of steps in FIG. 2. Similarly, the process of step S1, in which it is determined whether the vehicle is an MT vehicle, may be performed as a premise for performing the operation flow of FIG. 2.

Also in the above embodiment, the gear position is calculated based on the vehicle speed and the engine speed. However, the subject to be calculated is not limited to the gear position if it is possible to determine to which area in the coordinate space the target coordinate point specified by the vehicle speed and engine speed belongs.

What is claimed is:

1. A determination method for permitting deceleration regeneration or charge of a hybrid vehicle, wherein:
   said hybrid vehicle comprises:
   an engine for outputting force for driving the vehicle;
   an electric motor for assisting the output from the engine; and
   a battery device for storing charged energy generated by the electric motor which functions as a generator for deceleration regeneration or charge, and
   said determination method comprising:
   a first determination step of detecting a clutch operation performed by a driver and determining a connection state of the clutch;

a second determination step of determining a connection state of the clutch based on a correspondence relationship between vehicle speed and engine speed, which is predetermined for each of a plurality of gear positions; and a permission determining step of permitting the deceleration regeneration or charge by the motor when it is determined that the clutch is connected both in the first and second determination steps, wherein a series of said steps is repeatedly executed, and the second determination step includes:

calculating one of a plurality of gear positions based on actually-detected vehicle speed and engine speed by referring to a correspondence relationship between the vehicle speed and engine speed, which is predetermined for each of said gear positions; and     determining that the clutch is connected when there is no temporal change with respect to the calculated gear position.

2. A determination apparatus for permitting deceleration regeneration or charge of a hybrid vehicle, wherein:

said hybrid vehicle comprises:

an engine for outputting force for driving the vehicle;

an electric motor for assisting the output from the engine; and     a battery device for storing charged energy generated by the electric motor which functions as a generator for deceleration regeneration or charge, and said determination apparatus comprising:

a first determination section for detecting a clutch operation performed by a driver and determining a connection state of the clutch;

a second determination section for determining a connection state of the clutch based on a correspondence relationship between vehicle speed and engine speed, which is predetermined for each of a plurality of gear positions; and a permission determining section for permitting the deceleration regeneration or charge by the motor when it is determined that the clutch is connected both in the first and second determination sections, wherein a series of processes performed by said sections is repeatedly executed, and the second determination section:

calculates one of a plurality of gear positions based on actually-detected vehicle speed and engine speed by referring to a correspondence relationship between the vehicle speed and engine speed, which is predetermined for each of said gear positions; and     determines that the clutch is connected when there is no temporal change with respect to the calculated gear position.

\* \* \* \* \*